United States Patent [19]

Chiu

[11] Patent Number: 5,305,207
[45] Date of Patent: Apr. 19, 1994

[54] GRAPHIC LANGUAGE CHARACTER PROCESSING AND RETRIEVING METHOD

[76] Inventor: Jen-Hwa Chiu, No. 116, Hsin I Road, Section 3, Taipei, Taiwan

[21] Appl. No.: 28,278

[22] Filed: Mar. 9, 1993

[51] Int. Cl.$^5$ .............................................. G06F 15/38
[52] U.S. Cl. .............................. 364/419.09; 364/419.01
[58] Field of Search .......................................... 364/419

[56] References Cited

U.S. PATENT DOCUMENTS

| | | | |
|---|---|---|---|
| 4,462,703 | 7/1984 | Lee | 400/110 |
| 4,505,602 | 3/1985 | Wong | 400/110 |
| 4,559,615 | 12/1985 | Goo et al. | 364/900 |
| 5,119,296 | 6/1992 | Zheng et al. | 364/419 |

Primary Examiner—Roy N. Envall, Jr.
Assistant Examiner—Ari M. Bai
Attorney, Agent, or Firm—Andrus, Sceales, Starke & Sawall

[57] ABSTRACT

A processing and retrieving method for the characters of a character language to/from a memory device. The character is built-up with at least one unit or root. The method comprises the steps of designating the first stroke of the unit with a first number, designating the last stroke of the unit with a number, assembling a numerical group for the character from the numbers, and using the groups to process or retrieve the character to/from the memory device.

6 Claims, 9 Drawing Sheets

GRAPHIC LANGUAGE CHARACTER PROCESSING AND RETRIEVING METHOD

The present invention relates to a method for processing and retrieving the characters of a character language to/from a memory device in which such characters are stored. In a character language, such as Chinese or Japanese, the elements of the written language are graphic symbols or characters. Such a language is to be distinguished from an alphabet language, such as English, Spanish, or French, in which the elements are the letters of an alphabet.

BACKGROUND OF THE INVENTION

With the advent of electronic storage or memory devices or registers, the processing, storing and retrieving of language elements has become increasingly important. Alphabet languages, such as English, are relatively easy to adapt to such devices. A keyboard is provided with the letters on individual keys. A code is assigned to each letter of the alphabet. The code may be a binary, digital code, such as an ASCII code. The code is entered in a register by depressing the lettered keys and circuitry associated with the register carries out the entry and manipulates the code in the desired manner. The register may have an associated display, such as a video terminal or printing mechanism, in which the characters appear.

The same technique can be applied to the digits of an Arabic numeration system.

Character languages are much more difficult to adapt to encoding and to storage registers. One problem is the large number of characters in such a language. For example, approximately 3,500 characters are required to write and read a simple Chinese language novel and a scholar must know at least 10,000 characters to read classical Chinese literature. It is difficult or impossible to assign a key of a keyboard or other entry device to each character of such a language. Due to the unique quality of each character, it is also difficult to assign keys to the various elements of the characters with a view to constructing a character through some combination of successive key strokes.

Notwithstanding the foregoing problems, there are several Chinese character processing and retrieving methods currently in use in the Republic of China and/or the Peoples' Republic of China. However, none of these are easy to learn and use. Further, they lack a "scientific" design or analytical basis. As a result, they are not suitable for the general public and the application of apparatus containing electronic storage devices or registers to the Chinese language has not become widespread or popular.

One of the best Chinese character processing methods is called "ChanJei". Basically, this method uses English alphabet letters to represent a root and its derivative roots. Twenty-four basic roots, 62 units, and 240 strokes are defined.

The shortcomings of this method are that the method is too complicated to learn and to use. And, it is not scientifically designed. Each root and its derivations must be remembered by the user. But such roots are easily forgotten. Since one English alphabet letter represents a basic root and its derivations, it is difficult to use to assemble a character. With higher level data processing techniques, this "interface" inputting method cannot directly change the codes involved.

Another widely used Chinese character processing method is the "Da I" method. It uses "basic roots", "first stroke" and "unit character", etc. A total of 402 units are used in this method. These units are designated by 86 English alphabet units. Many alphabet letters are repeatedly used, as well as the digits 0–9.

The shortcomings of this method are the same as with the "ChanJei" method. The two foregoing methods cannot be used to "directly" input a character to a register. Rather, they need an interface. Additionally, these two methods can only be used by professional typists, because one needs a high degree of skill to overcome the difficulties of the methods. In use, the typist needs to use both his/her two hands and eyes to select a series of different keys to assemble a character. This takes a long time to carry out. Only after a painstaking effort is made, can the typist use these methods. In light of this, only a well trained typist can use these methods. Ordinary people find it difficult or impossible to use these methods.

The third widely used inputting method is the "Chu-In-Fu-How" method. This method is much easier than the above-mentioned methods. But in application, if the user forgets the correct pronunciation of the character, the user can never assemble a Chinese character. Also, in the Chinese language there are many instances in which different characters have the same pronunciation. This brings much trouble to a user of this method and lessens its usefulness.

Thus, without a simplified processing and retrieving method, the implementation of electronic apparatus to use with a character language, such as Chinese, is limited.

SUMMARY OF THE PRESENT INVENTION

The object of the present invention is therefore to provide an improved, effective, and simple method for processing and retrieving the characters of a character language, such as Chinese, to/from a storage or memory device which overcomes the shortcomings of existing methods.

More particularly, the present invention provides an effective and simplified character language processing and retrieving method which has a scientific, analytical basis and which is easy to learn and to employ. The need for the user to memorize a lot of roots and their derivations is thus avoided. As a result, the method of the present invention is suitable for use by the general public.

The method of the present invention uses only concise numeral groups, for example a two numeral group or multiple, two numeral groups, to process and retrieve a graphic character from a memory device. The need for the user to learn and remember lots of roots and their derivatives is thus avoided. The simplicity and effectiveness of the improved method of the present invention is enhanced in that it may be carried out using Arabic numbers comprising only ten digits.

The present invention results from the inventor's extensive and painstaking research that the first stroke of each Chinese character comprises one of five finite strokes, each of which can be identified with a corresponding Arabic number. The strokes include the following: a vertical stroke " " which can be designated in the method of the present invention with an Arabic number "1"; a horizontal stroke " " which is designated with an Arabic number "2"; a left-down stroke " " which is designated with an Arabic number "3"; a right-down stroke " " which is designated with an Arabic number "4"; and a vertical-left stroke " " which is designated with an Arabic number "5".

The last stroke of each Chinese character comprises one of ten finite strokes. These include the five finite strokes found in the first stroke. They also include the following five strokes: a right-hook stroke " " which is designated in the method of the present invention with an Arabic number "6"; a horizontal-up stroke " " which is designated with an Arabic number "7"; a right-down flat stroke " " which is designated with an Arabic number "8"; a flat-hook stroke " " which is designated with an Arabic number "9"; and a left-up stroke " " which is designated with an Arabic number "0".

Thus the first stroke of a language character can be designated by the number "1", "2", "3", "4" or "5" and the last stroke can be designated by the number "1", "2", "3", "4", "5", "6", "7", "8", "9" or "0". The designations for the first strokes and the designations for the last strokes can jointly build up a numeral group, or groups, that can be used to process and retrieve a character to and from a memory device in a fascile and highly effective manner.

The method of the present invention for processing and retrieving a Chinese character stored in a memory device includes the steps of: designating the first stroke of a character unit with a first Arabic number; designating the last stroke of the character unit with a second Arabic number; assembling a numerical group for the character from the numbers of the units and applying the numerical group to the memory device to store and retrieve a character unit to/from a memory device. Retrieved characters may be visually displayed or subjected to further processing.

BRIEF DESCRIPTION OF THE DRAWING

The graphic character processing and retrieving method according to the invention will now be described, by way of example, with reference to the accompanying drawings, in which.

DETAILED DESCRIPTION OF THE PREFERRED EMBODIMENT

Figure 1:
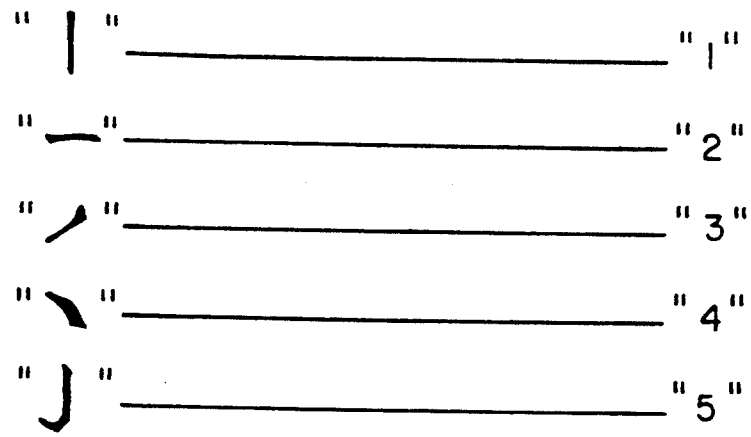
Fig. 1 a table illustrating the designation of the first stroke and last stroke of a character, such as a Chinese character, with an Arabic number.
Figure 1:
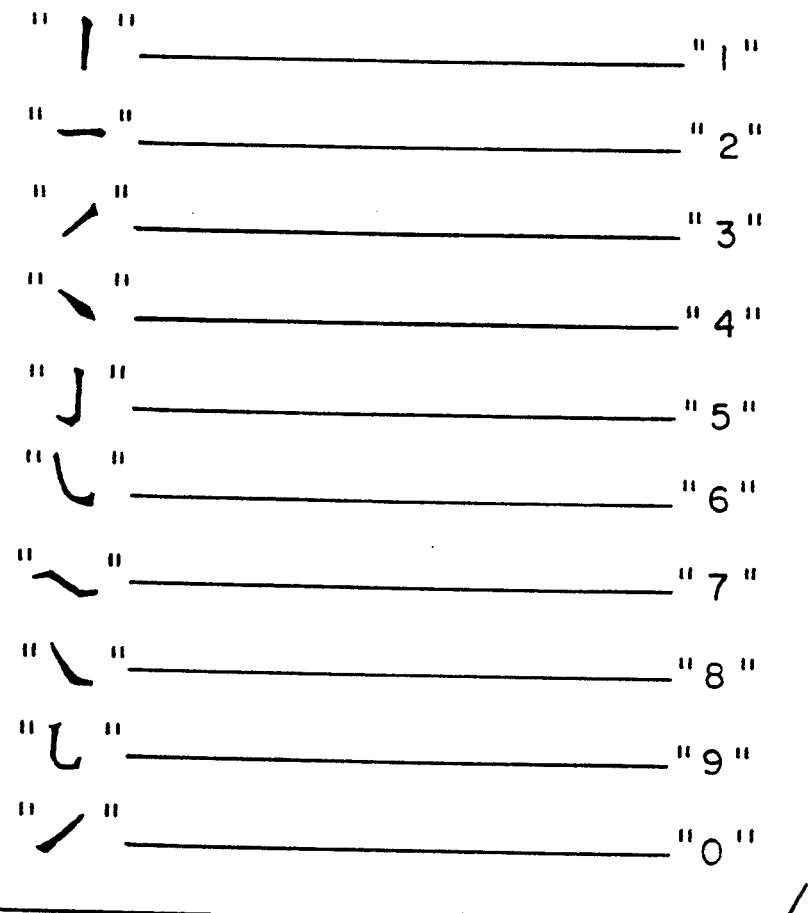

FIG. 1 shows, in tabular form, each of the five finite strokes forming the first stroke of a Chinese character or unit thereof, along with the associated Arabic numbers, "1" through "5". FIG. 1 also shows each of the ten finite strokes forming the last stroke of a Chinese character or unit thereof, along with the associated Arabic numbers, "1" through "0".

Figure 2A:
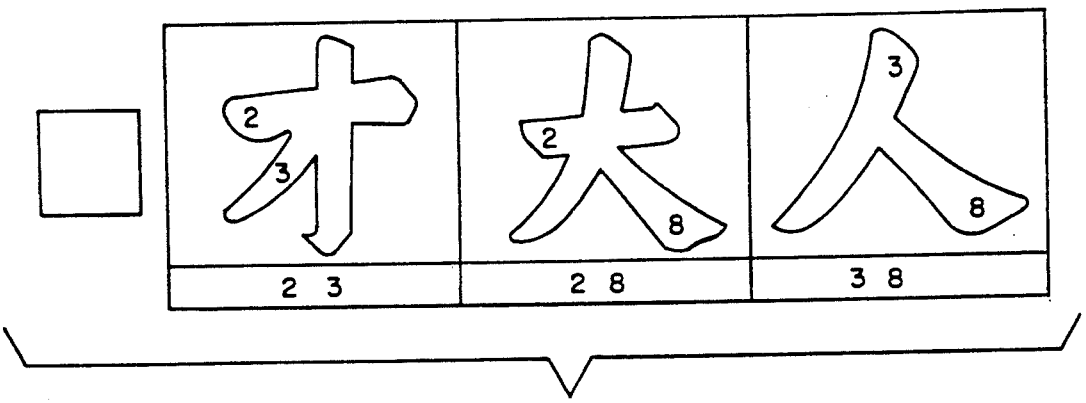
FIG. 2a, 2b, 2c, 2d, 2e, 2f, 2g, 2h, 2i, and 2j show variations of such characters and how numerical groups are taken from these characters in accordance with the graphic character processing and retrieving method according to the invention.

FIG. 2a shows three typical Chinese language characters of the "single" or "independent" type. Characters of this type are formed of a single unit or root. In FIG. 2a, the first stroke of the Chinese character " " is a horizontal stroke. Referring to the upper portion of the table of FIG. 1, such a stroke is designated by the Arabic number "2 ". The last stroke of " " is a left down stroke. Referring to the lower portion of the table of FIG. 1, such a stroke is designated by the Arabic number "3". The Arabic numeral group of " " is thus "2 ". In the memory device, the character " " is assigned a corresponding Arabic numeral group "2 3" in a look-up table or other appropriate concordance.

To retrieve the Chinese character " ", the numeral group "2 3" is applied to the memory device to provide the necessary output for graphic display, printing, or other processing of the character.

In another example, the first stroke of " ", also shown in FIG. 2a, is a horizontal stroke, which, as noted above, is designated by the Arabic number "2". The last stroke is " ", which is designated by the Arabic number "8". The numeral group for the Chinese character " " is "2 8", one can retrieve " " from the memory device.

As shown in FIG. 2a, the numeral groups applied to characters of the "single" or "independent" type for processing and retrieval purposes comprise only two numbers.

However, not all Chinese characters are built with a single root or unit as are the characters shown in FIG. 2a. Rather, Chinese characters have a variety of configurations.

Figure 2B:
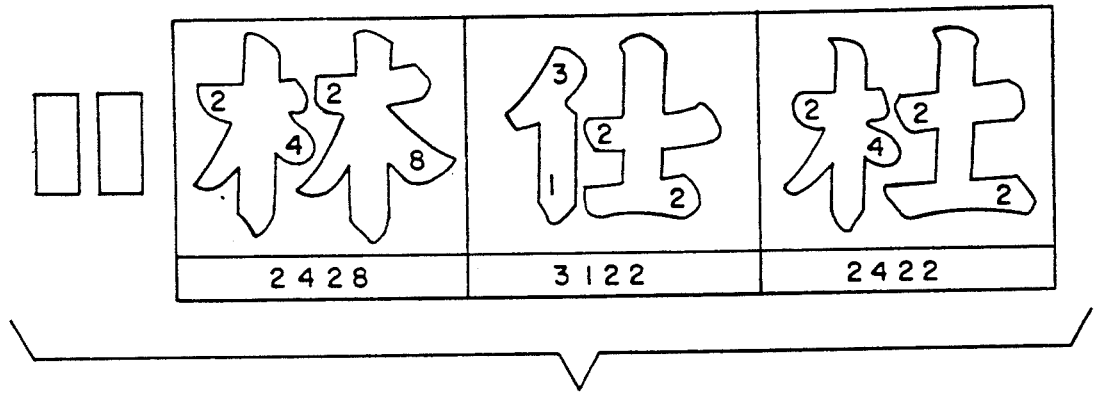

In FIG. 2b, a "juxtaposed" type of character is shown. In this case, the character is formed with two independent units or roots. Three typical characters of this type are shown in FIG. 2b, along with the numeral groups devised in the manner described above. In most cases, the groups used with this type of character are formed of two pairs of numbers, i.e. a total of four numbers.

Figure 2C:
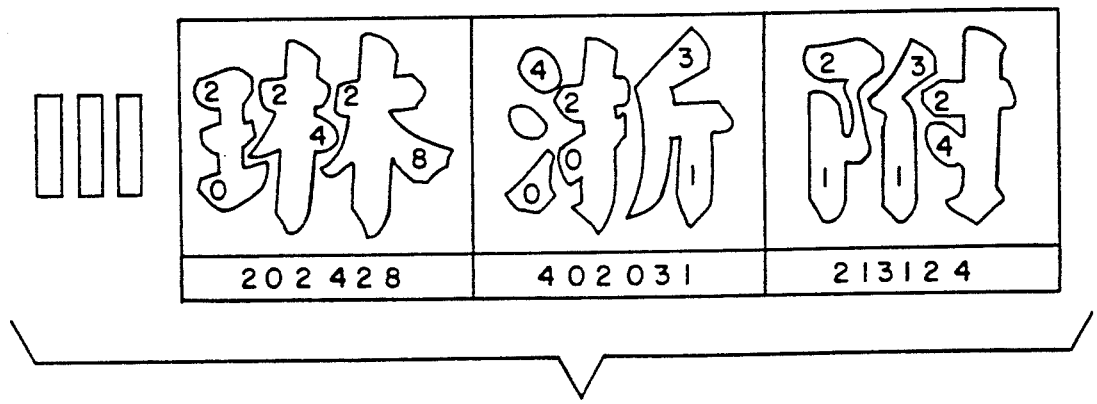

In FIG. 2c, "triplet type characters" are shown. Three typical characters of this type are shown. A character of this type is formed with three independent units or roots. In most cases, the numeral groups used in this type are three pairs of numbers, i.e. a total of six numbers.

Figure 2D:
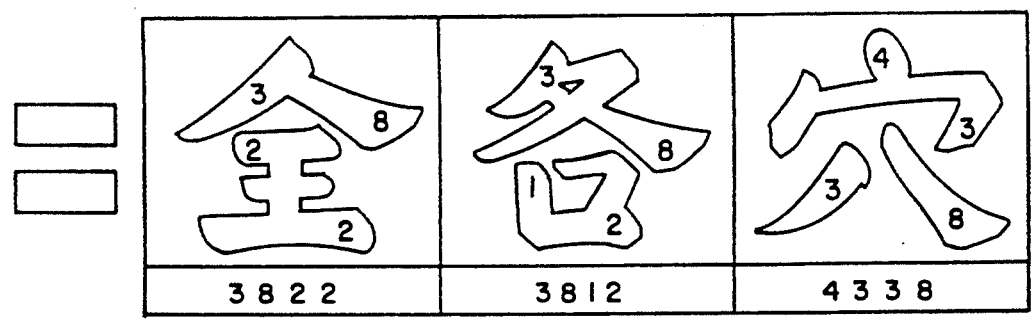

In FIG. 2d, three different characters are shown. This type of character can be defined as a "two-story tower" configuration. This means that a unit or root is placed upon another unit or root. In the case of a character of this type, the first pair of numbers is taken from the upper part and the second pair of numbers is taken from the lower part. A total of four numbers are used to retrieve a character of this type.

Figure 2E:
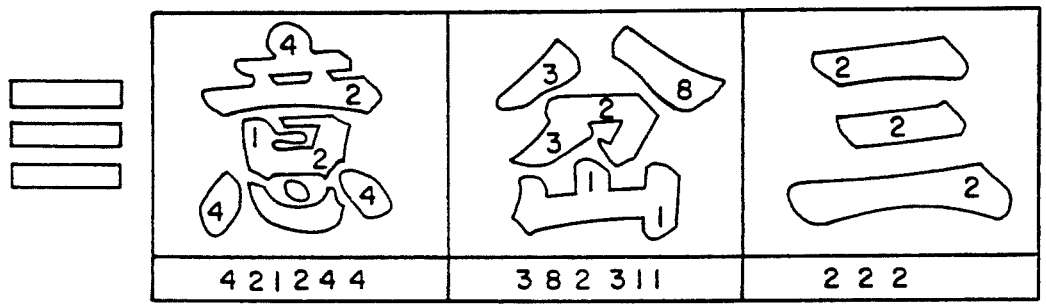

In FIG. 2e, three, further, different characters are shown. This type of character can be defined as a "three-story tower" configuration. That means, the character is formed with three different units or roots in a type of sandwich. In this case, the first pair of numbers is taken from the upper part, the second pair of codes is taken from the middle part, and the third pair of numbers is taken from the lower part. A total of six numbers are used to retrieve a character of this type.

Figure 2F:
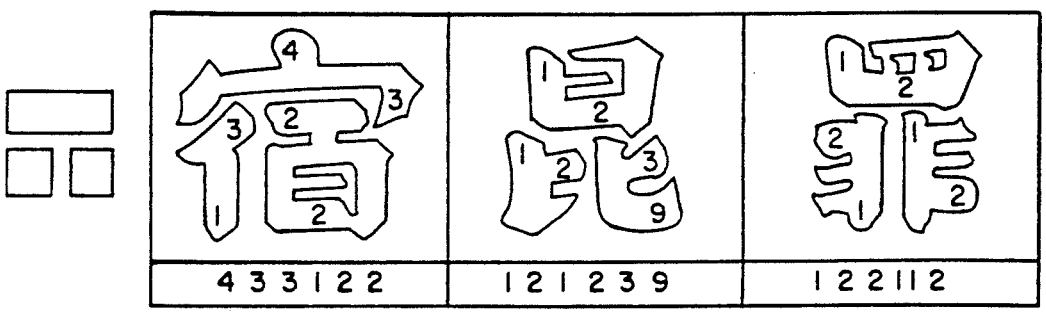

A still further type of character is shown in FIG. 2f. This type of character can be described as a "standing-horse" character. In this case, a unit or root is sitting upon two independent units or roots, which are juxtaposed together in the manner of a horse having a body supported by a pair of front legs and a pair of back legs. The sequence in which the units are developed to numbers is from up to down and from left to right. Six numbers are used to retrieve this type of character. The corresponding numeral groups are shown below the characters.

Figure 2G:
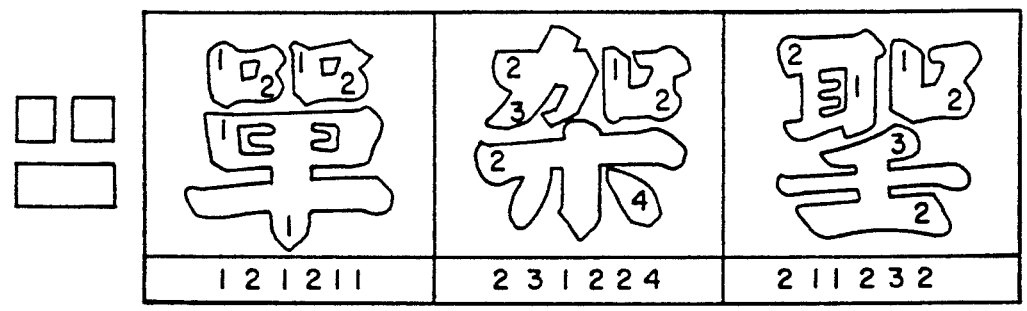

In FIG. 2g, characters that can be described as a "lying horse" are shown. In this case, two juxtaposed units or roots are sitting upon a unit or a root in the manner of a horse having a body lying on the ground with a pair of front legs and a pair of back legs extending upward. The sequence in which the units are developed to numbers is from up to down and from left to right. Again, six numbers are used to retrieve this type of character. The corresponding groups are shown below the characters.

Figure 2H:
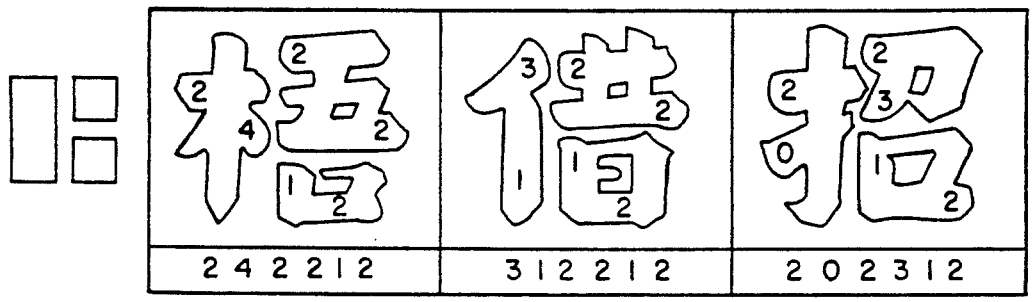

Another variation of characters can be defined as a "left up-side-down horse", as shown in FIG. 2h. In this configuration, a single unit is located in the left side, and a "two-story"type of character is located in the right side. Similar to other characters that are formed with three units, six numbers are used to retrieve this type of character. The corresponding numeral groups are shown below the characters.

Figure 2I:
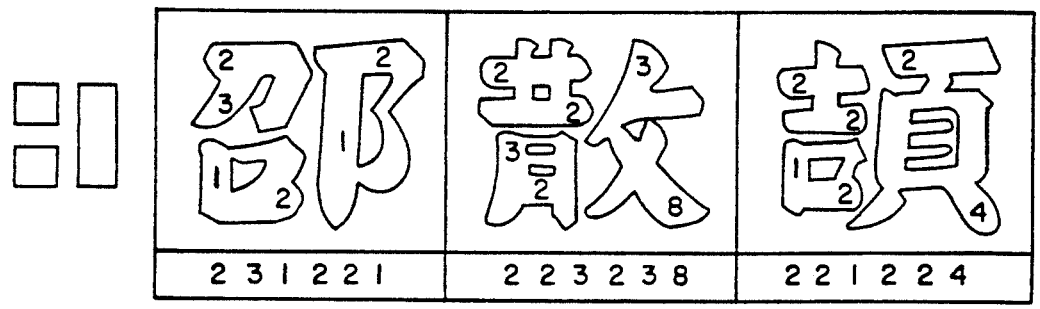

In FIG. 2i, a variation is shown that can be defined as a "right up-side-down horse". In this configuration, a single unit is located in the right side, and a "two-story" type of character is located in the left side. Similar to other units that are formed with three units, six numbers are used to retrieve this type of character. The corresponding groups are shown below the characters. Three typical characters are shown for reference.

Figure 2J:
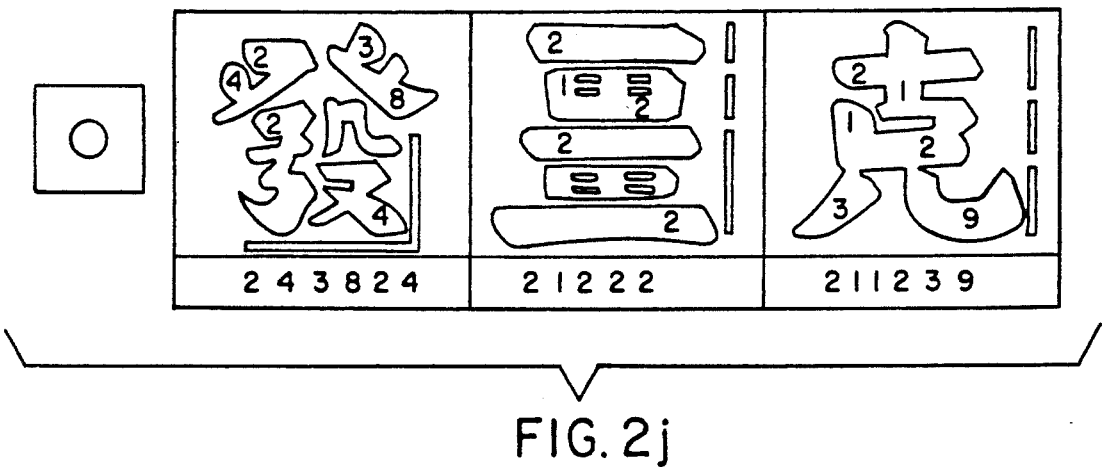

A final variation of characters are those that cannot be attributed to any of the types described above, but basically, can be divided into three units or roots. Typical characters of this type, along with the associated numeral codes are shown in FIG. 2j. The development sequence for the characters of FIGS. 2h, 2i and 2j is the same as for FIGS. 2f and 2g.

As shown in FIGS. 2a-2j, many Chinese characters are built with more than one unit or root. But by using the graphic character processing and retrieving method of the present invention with these characters, they can be represented by no more than six numbers. This means that no more than six numbers are needed in the processing and retrieving method of this invention.

In some cases, a character is formed with more than three units or roots. For example, " " is built with five units. They are " ", " ", " ", " " and " ". In designating numbers, the first group of numbers is taken from " "; the second group of numbers from " ", and the third group of numbers from the " ", which is the combination of " ", " " and " ". In light of this, even this character will only take three groups of numbers for retrieving a character.

Of course, with those characters built with two units " " and three units " " or even one unit " ", the numerical groups still originate from their basic units. For those characters formed with less than three units, the codes are taken from each of the units used to construct the character.

From this above mentioned description, it can be seen that a complicated Chinese character can be represented by a simple group, or groups, of numbers and by using the numerical group, or groups, a character can be retrieved from a memory device. With this method, the user can easily process/retrieve the character even if he/she does not know how the character is read and no matter how difficult it is. The only thing he/she needs to do is to utilize the numbers for the first stroke and last stroke of each unit. Then, for example, the whole Chinese character can be retrieved from the memory device and shown on a display screen.

Figure 3:
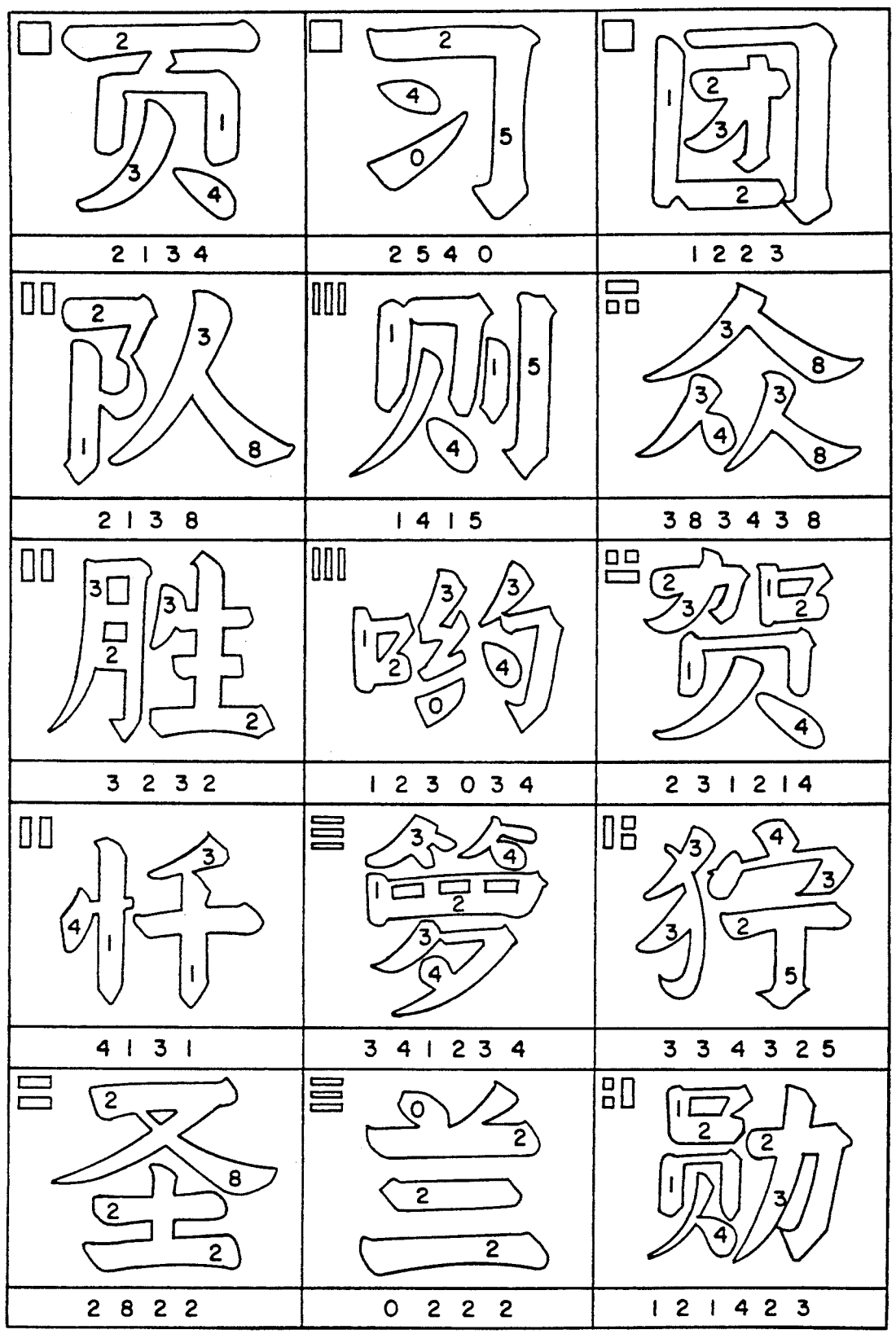
FIG. 3 shows application of the graphic character processing and retrieving method according to the invention in connection with .simplified Chinese characters.

Not only does this graphic character processing and retrieving method according to this invention apply to conventional or classical Chinese characters, it also applies to the newer, simplified characters used in mainland China, as shown in FIG. 3. For example, the character " " shown in FIG. 3 can be divided into two parts. Hence one employs the numbers "2" "1" for " " and the numbers "3" "4" for " ". When the numerical code "2 1 3 4" is inputted to the memory device, " " will appear as the character on the display screen. The other examples shown in FIG. 3 are similar and are believed to be self-explanatory.

Figure 4:
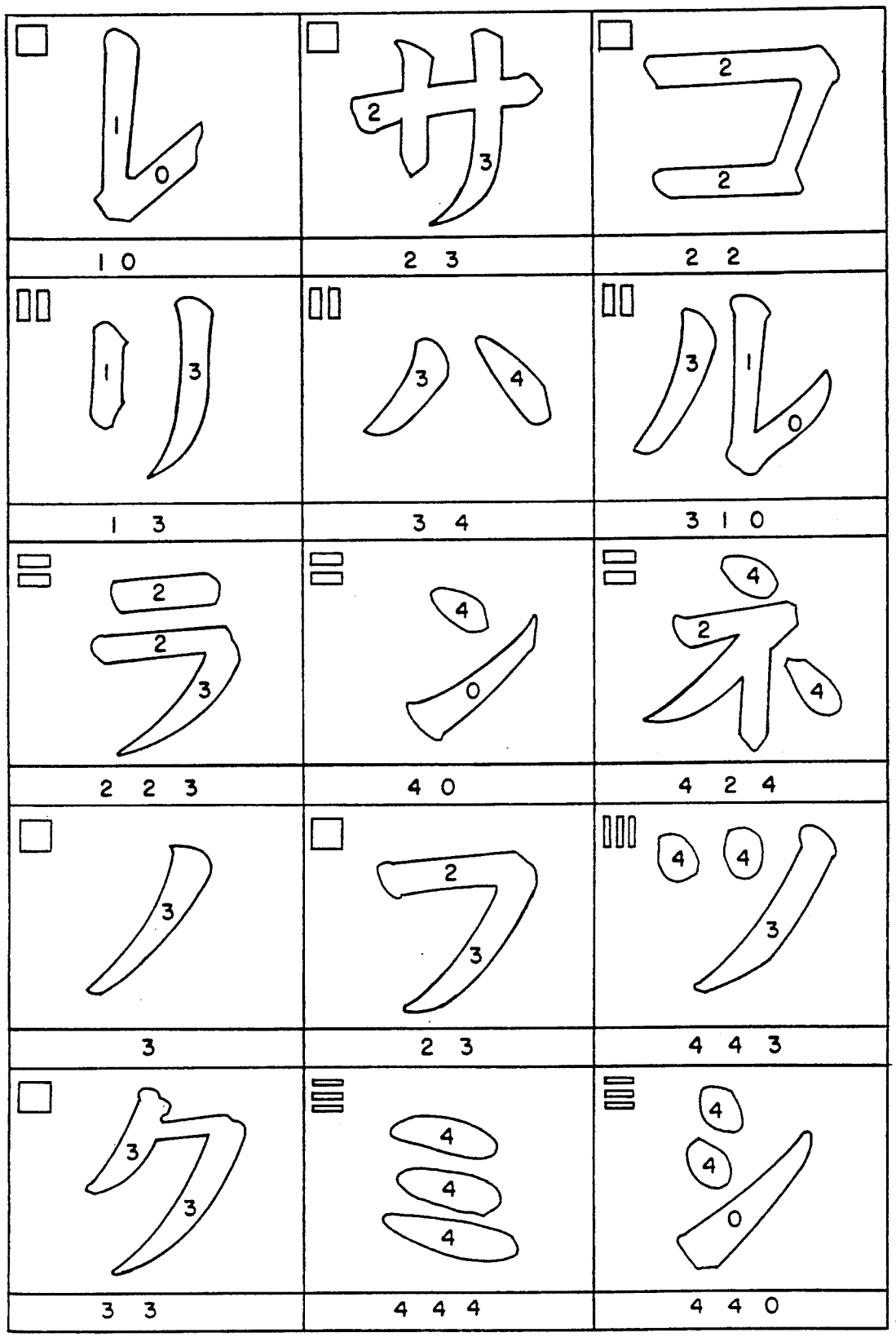
FIG. 4 shows application of the graphic character processing and retrieving method according to the invention in connection with simplified Japanese characters.

FIG. 4 shows the graphic character processing and retrieving method as applied to Japanese characters. Japanese characters are built up with 52 units or roots. Again, the first stroke and last stroke of Japanese characters are limited to those strokes described above. Hence " " can be represented as "1 0", " " can be represented as "2 3", etc. as shown in FIG. 4. Use of this method of the present invention to retrieve a character is very easy, convenient and effective.

Figure 5:
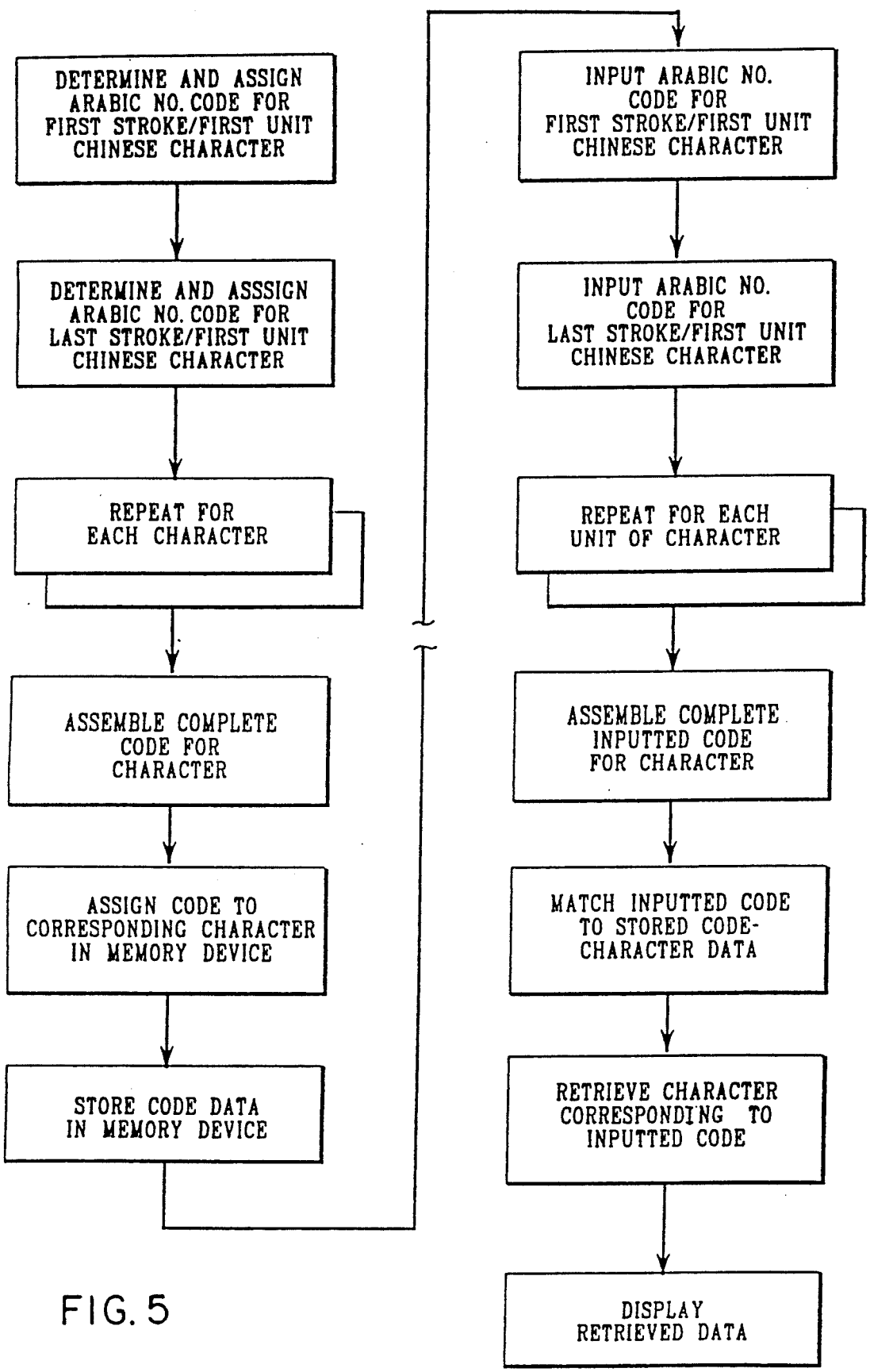
FIG. 5 is a flow chart outlining the graphic character processing and retrieving method according to the present invention.

FIG. 5 is a flow chart showing the steps of the improved character language processing and retrieving method of the present invention, described above in textual form, in graphic form.

As noted in FIG. 5 and as described above, the Arabic number for the first and last stroke of the first of the character unit is determined and assigned. These steps are repeated for each unit of the character to assemble the Arabic numeral group for the character. The concordance between the Arabic numeral group and the Chinese language character is then stored in a memory device.

To retrieve the Chinese language character, the Arabic numbers code for each character unit of the Chinese language character are assembled and matched to the stored character data by means of the concordance to retrieve the character corresponding to the inputted code for display or further processing.

Figure 6:
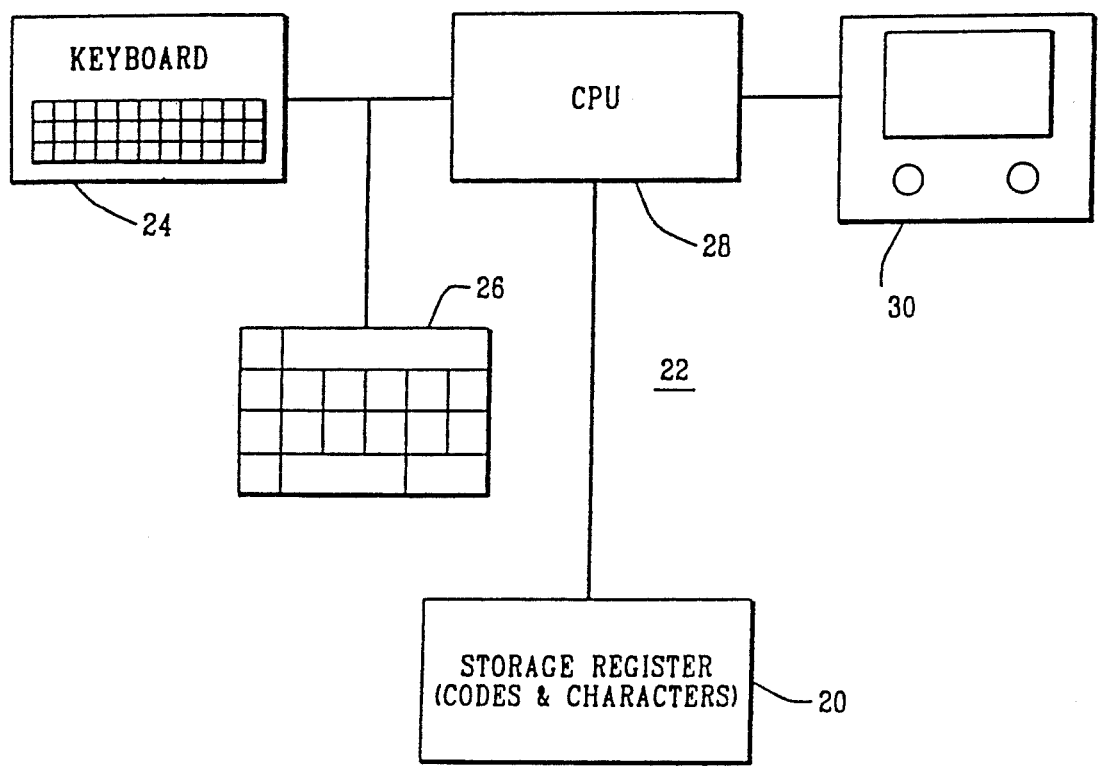
FIG. 6 is a block diagram of apparatus that can be used to carry out the graphic character processing and retrieving method according to the invention.

FIG. 6 shows one embodiment of apparatus suitable for use in practicing the method of the present invention. While a digital computer is shown for exemplary purposes in FIG. 6, it will be appreciated that the invention may be carried out with other electrical apparatus or electrical-mechanical apparatus, such as a power typewriter. In Fig. 6, the Arabic numeral groups and Chinese language characters are contained in a storage register 20 of computer 22. The Arabic numeral groups may be inputted by means of a conventional keyboard 24. Or, a special input device 26, shown in FIG. 7 and described, in detail, below, can be utilized. Computer 22 contains central processing unit 28 for matching the inputted Arabic numeral group, or groups, to the stored data to retrieve the Chinese language character corresponding to the numeral group or groups. The character may be displayed on video display device 30.

Figure 7:
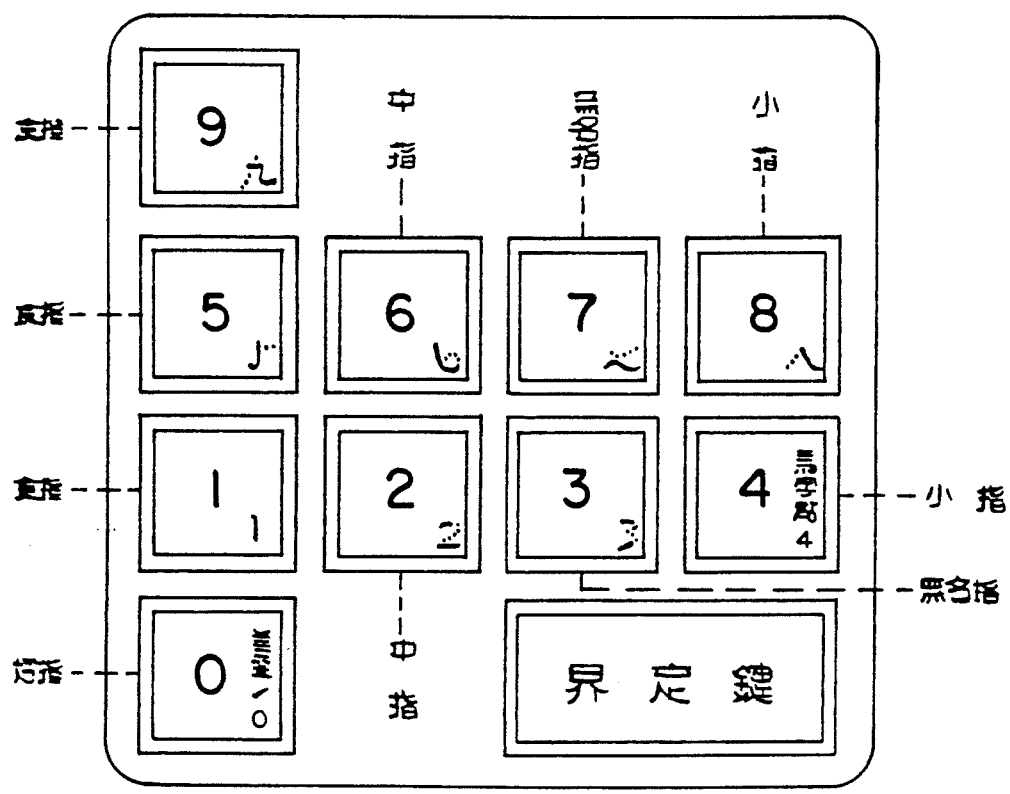
FIG. 7 is an inputting device for the graphic character processing and retrieving method according to the invention.

FIG. 7 shows a unique keyboard 26 suitable for entering the Arabic numeral groups employed in the method of the present invention into a memory device in a rapid and efficient manner. In the keyboard 26, the 0 and enter keys are located in a bottom line of the keyboard. The keys for entering the numerals 1 through 4 are located in a second row of the keyboard. Keys 5 through 8 are located in a third row. The arrangement of the second and third rows of keyboard 26 permit easy operation by the four fingers of, particularly, the right hand for rapid entry of the codes. The key for entering "9" is located in a fourth row of the keyboard.

I claim:

1. A method for identifying a character of a character language stored in a memory device for retrieval from the memory device, the characters having at least one unit formed of a first stroke and a last stroke, the first stroke having a finite number of variations; the second stroke having a finite number of variations; said method comprising the steps of:

assigning a number to each of the variations of the first stroke;

assigning a number to each of the variations of the second stroke;

determining for the first stroke of a given character unit the number corresponding to the first stroke;

determining for the last stroke of the character unit, the number corresponding to the last stroke of the given character unit;

assembling a numerical group for the character comprised of the numbers corresponding to the first and last strokes of the units of the character; and assigning the numerical group to the character in the memory device.

2. A method as recited in claim 1, further defined as assigning Arabic numbers to the first and last strokes of the character unit.

3. A method as recited in claim 2 wherein the first stroke is assigned Arabic numbers "1, 2, 3, 4, and 5".

4. A method as recited in claim 2 wherein the last stroke is assigned Arabic numbers "1, 2, 3, 4, 5, 6, 7, 8, 9, and 0".

5. The method according to claim 1 further defined as a method for retrieving the characters of a character language from the memory device, said method comprising the further steps of:

assembling a numeral group corresponding to the first and last strokes of each unit of the character;

matching the assembled numeral group to the stored character;

retrieving the stored character corresponding to the inputted numeral group from the memory device.

6. The apparatus of claim 5 further defined as displaying the retrieved character.

* * * * *